United States Patent [19]

Tajiri et al.

[11] Patent Number: 6,153,248
[45] Date of Patent: Nov. 28, 2000

[54] LOW-FAT SPREAD

[75] Inventors: Asuka Tajiri; Osamu Kimura, both of Saitama; Yasuhiko Shiinoki, Tokyo, all of Japan

[73] Assignee: Snow Brank Milk Products Co., Ltd., Hokkaido, Japan

[21] Appl. No.: 09/308,799

[22] PCT Filed: Sep. 21, 1998

[86] PCT No.: PCT/JP98/04239

§ 371 Date: May 24, 1999

§ 102(e) Date: May 24, 1999

[87] PCT Pub. No.: WO99/15025

PCT Pub. Date: Apr. 1, 1999

[30] Foreign Application Priority Data

Sep. 24, 1997 [JP] Japan .................................. 9-258690

[51] Int. Cl.[7] .................................................. A23D 7/015
[52] U.S. Cl. .......................... 426/604; 426/603; 426/601
[58] Field of Search .................................. 426/601, 603, 426/604

[56] References Cited

U.S. PATENT DOCUMENTS

| | | | |
|---|---|---|---|
| 2,745,750 | 5/1956 | Shafer | 426/603 |
| 4,540,593 | 9/1985 | Moran | 426/604 |
| 4,772,483 | 9/1988 | Nolte | 426/603 |
| 4,839,190 | 6/1989 | Bunbalough | 426/603 |
| 4,960,606 | 10/1990 | Crosby | 426/603 |
| 4,978,553 | 12/1990 | Silver | 426/603 |
| 5,075,125 | 12/1991 | Mongeau | 426/603 |
| 5,217,742 | 6/1993 | Jones | 426/603 |
| 5,244,688 | 9/1993 | Norton | 426/601 |
| 5,338,560 | 8/1994 | Wesdorp | 426/603 |
| 5,656,323 | 8/1997 | Underdown | 426/603 |
| 5,773,073 | 6/1998 | Matsuda | 426/603 |

OTHER PUBLICATIONS

Clegg 1996 Low fat Margarine Spreads as Affected by Aqueous Phase Hydrocolloids J. Food Science 61(5)1073.

*Primary Examiner*—Carolyn Paden
*Attorney, Agent, or Firm*—Knobbe, Martens, Olson & Bear, LLP

[57] ABSTRACT

In preparation of a salt-containing low-fat spread with no more than 40 wt. % fat content, it is possible to provide a salt-containing low-fat spread which melt well in the mouth and the emulsification of which is swiftly broken, thereby releasing a preferable flavor once placed in the mouth and yet causing no problems in manufacturing, by selecting and combining emulsifiers so that a specific demulsification property with an electric conductivity rise of at least 0.1 mS/cm within 300 seconds at approximately 36° C.

12 Claims, 8 Drawing Sheets

LOW-FAT SPREAD

This application is the U.S. National Phase under 35 U.S.C. §371 of International Application PCT/JP98/04239, filed Sep. 21, 1998, which claims priority based on JP 9-258690, filed Sep. 24, 1997.

TECHNICAL FIELD

The present invention relates to A salt-containing low-fat spread having a good melting property in the mouth, which is demulsified swiftly to release good flavor in the mouth once placed in the mouth.

BACKGROUND ART

The national nutrition inquiry of 1995 has pointed out a tendency of consuming too much fat. Due also to the heightened interest in health, the demand is increasing on cheese, cream, and other fat products, which have lowered fat content. However, there is a tendency that the demand on low-fat spread is decreasing.

Low fat spread, as well as other spreads, is a variety of water-in-oil type emulsified fat compositions, made by a process including the steps of refrigerating a water-in-oil type emulsion comprising of aqueous and oil phases to solidify and kneading the solidified material thus obtained. Aqueous and oil phases, which do not miscible each other under normal conditions, are emulsified and dispersed each other by controlling their ratio or selecting the emulsifying and dispersing methods in order to make a water-in-oil type emulsion for the production of such spread. However, depending on the ratio of the two phases or the method of emulsification and dispersion, various problems concerning the production process and the qualities of the final products could arise. Such problems could include phase-conversion in the emulsifying step or the subsequent steps for sterilization, cooling and solidification and the rough textures in the final products. Especially in the case of the low-fat spread, its emulsion state is unstable, because the ratio of the aqueous phase to the oil phase is higher than that of the normal spread, thus more likely to result in problems described above. In order to solve these problems, it was necessary to add a stronger emulsifier or a larger amount of an emulsifier and a stabilizer for the low-fat spread production. However, the low-fat spread containing the stronger emulsifier or a larger amount of the emulsifier and the stabilizer had problems that since its emulsion state was not easily broken, the preferable flavor could not release in the mouth and that it did not melt well in the mouth. Therefore, such low-fat spreads have not been always preferred by the consumer.

One of the objects of present invention is to solve the above-described problems in the prior art. That is, the present invention provides a salt-containing low-fat spread, which has no problems in its production process and which has good properties concerning melting in the mouth and swift destruction of its emulsion state (which is referred as "demulsification"), in order to release a preferred flavor and taste when it is once placed in the mouth.

DISCLOSURE OF THE INVENTION

As results of enthusiastic investigation on the above problems, the present inventors have found that it is possible to evaluate the demulsification property of a spread as change in electric conductivity. Based on that discovery, the present inventors have found newly that it is feasible to establish the requirements for a good demulsification of a low-fat spread in the human mouth by measuring the change in its electric conductivity, and completed the present invention.

The low-fat spreads according to the present invention are characterized in having a fat content of 40 weight(wt.) % or less than 40 wt. % and an electric conductivity increase of 0.1 mS/cm or more than 0.1 mS/cm within 300 seconds at or near 36° C.

One of the embodiments of the present invention is a method of producing a salt-containing low-fat spread characterized in comprising of the steps of emulsifying and dispersing aqueous phase of 60 wt. % or more than 60 wt. % into oil phase of 40 wt. % or less than 40 wt. % which contains 0.01 to 0.35 wt. % of polyglycerol condensed ricinoleic acid ester and 0.3 to 0.8 wt. % of glycerin fatty acid ester.

The other embodiment of the present invention is a method of producing a salt-containing low-fat spread characterized in comprising the steps of emulsifying and dispersing aqueous phase of 60 wt. % or more than 60 wt. % into oil phase of 40 wt. % less than 40 wt. % which contains 0.01 to 1.0 wt. % polyglycerol condensed ricinoleic acid ester, 0.1 to 1.0 wt. % glycerin fatty acid ester and 0.05 to 1.0 wt. % organic acid monoglyceride.

According to the present invention, it is possible to produce a salt-containing low-fat spread having a good melting property in the mouth, which is demulsified swiftly and, thus, releases and spreads a preferable flavor and taste into the mouth when it is placed in the human mouth.

BEST MODE FOR CARRYING OUT THE INVENTION

Electric conductivity used in the present invention is defined an index to express whether a solution of electrolyte can easily pass electric current through it, and this electric conductivity can be measured by conventional methods. In the present invention, the spread is placed in de-ionized water, then the electric conductivity of said de-ionized water is measured. When the spread is demulsified, i. e., its emulsion state is broken, electrolytes such as sodium chloride included in the aqueous phase of the spread are released into the de-ionized water. The resulting change in electric conductivity during this process is measured. Based on the change of the electric conductivity thus measured, the demulsification property of the spread is evaluated.

Figure 1:
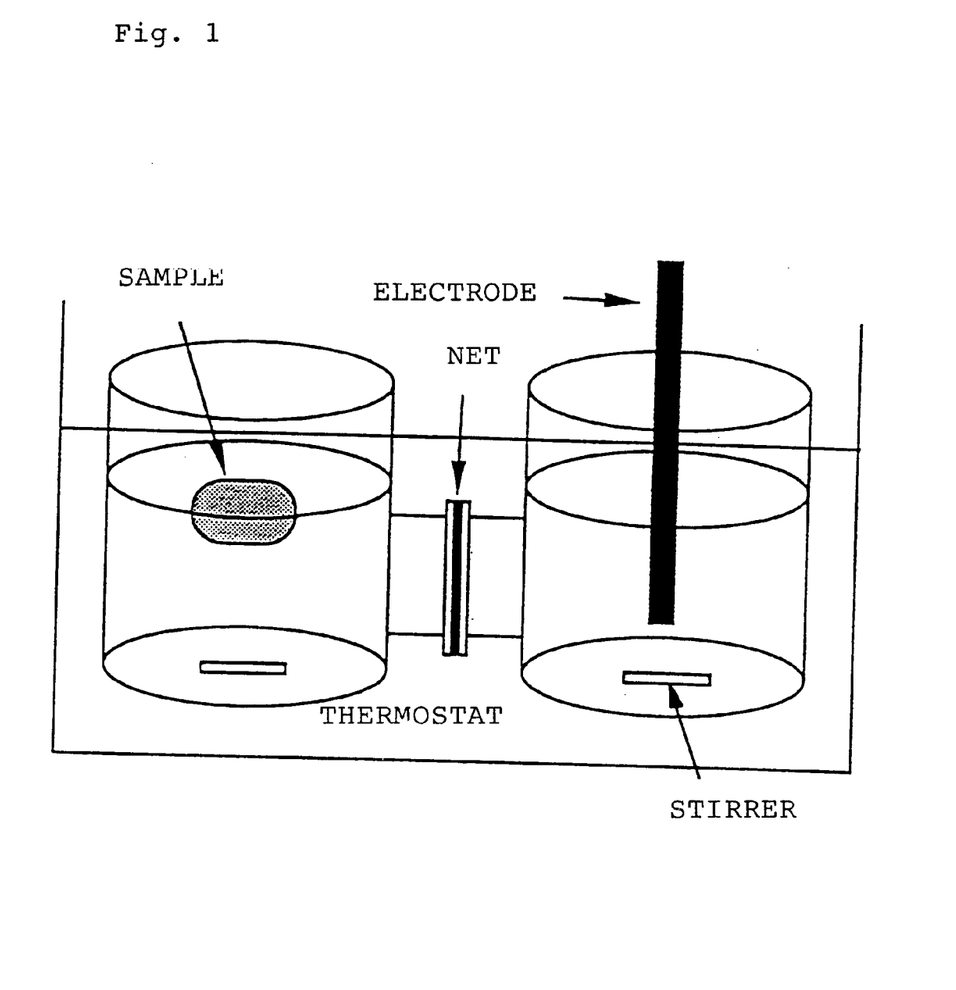
FIG. 1 is an illustration showing an apparatus which may be used in measuring electric conductivity in the present invention.

FIG. 1 shows one example of apparatus for measuring the change of electric conductivity used for evaluation of demulsification characteristics of the spread sample according to the present invention. Measurement of electric conductivity using this apparatus is able to conduct by connecting two beakers with a net between them in order to avoid direct contact of the sample with an electrode and placing the sample in de-ionized water kept at 36° C. substantially equivalent to the temperature inside the human mouth. When the sample placed in water is demulsified, salts contained in the aqueous phase of the spread is released into the water, and then the electric conductivity of the water increases. In order to obtain a spread which melts well in the mouth and makes taste good when eaten, it is preferable that the spread is demulsified at the normal human body temperature or near the normal human body temperature, i. e., around 36° C.: in a range 35 to 37° C., for example.

Figure 2:
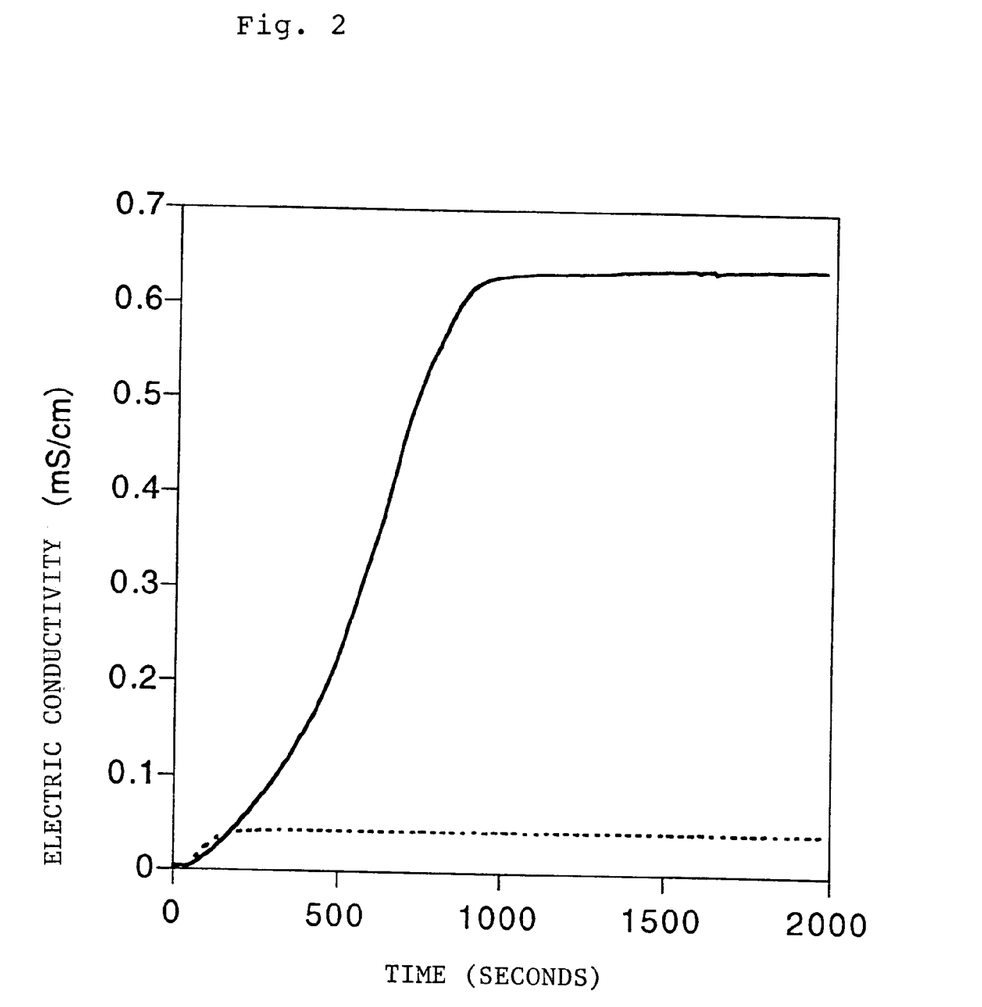
FIG. 2 shows the changes in electric conductivity in the spreads prepared according to the prior art. The solid line denotes a spread with 71 wt. % fat content. The broken line denotes a spread with 39 wt. % fat content.

When electric conductivity of spreads with at least 50 wt. % fat content according to the prior art at 36° C. were measured, as shown for example as the solid line in FIG. 2, a spread with 71 wt. % fat, 1.0 wt. % salt showed 0.63 mS/cm at approximately 1050 seconds and 0.65 mS/cm at approximately 1500 seconds. On the other hand, the low-fat spread according to the prior art having 39 wt. % fat and 1.3 wt. % salt showed a slight rise of electric conductivity at approximately 200 seconds but almost no change in electric conductivity afterward as shown by the broken line in FIG. 2.

Since the low-fat spread contains higher ratio of aqueous phase to oil phase as compared to the normal spread, glycerin fatty acid ester (abbreviated hereafter as MG) and other emulsifiers used commonly in normal spread, does not provide enough emulsification. Therefore, in preparation of the low-fat spread, emulsifiers such as polyglycerol condensed ricinoleic acid ester (abbreviated hereafter as PGPR) which is generally considered to be strong emulsifiers have been commonly used. However, since these emulsifiers have a stronger function for emulsification, it is difficult to destroy the emulsion state of the spread when it is eaten. As a result, such spread can not release and spread its flavor and lacks taste. Therefore, in the present invention, the fat content and the type of emulsifiers used to obtain the spread are investigated using electric conductivity, in order to provide low-fat spreads which is demulsified swiftly in the mouth.

Electric conductivity is used as an index of demulsification in the present invention. Demulsification is considered to be good, when electric conductivity at approximately 36° C. rises at least 0.1 mS/cm within 300 seconds. Upper limit of this electric conductivity increase is defined mostly by the quantity of salt. It can be set at 1.4 mS/cm at 2.0 wt. % salt, 1.1 mS/cm at 1.5 wt. % salt and 0.9 mS/cm at 1.3 wt. % salt.

Figure 3:
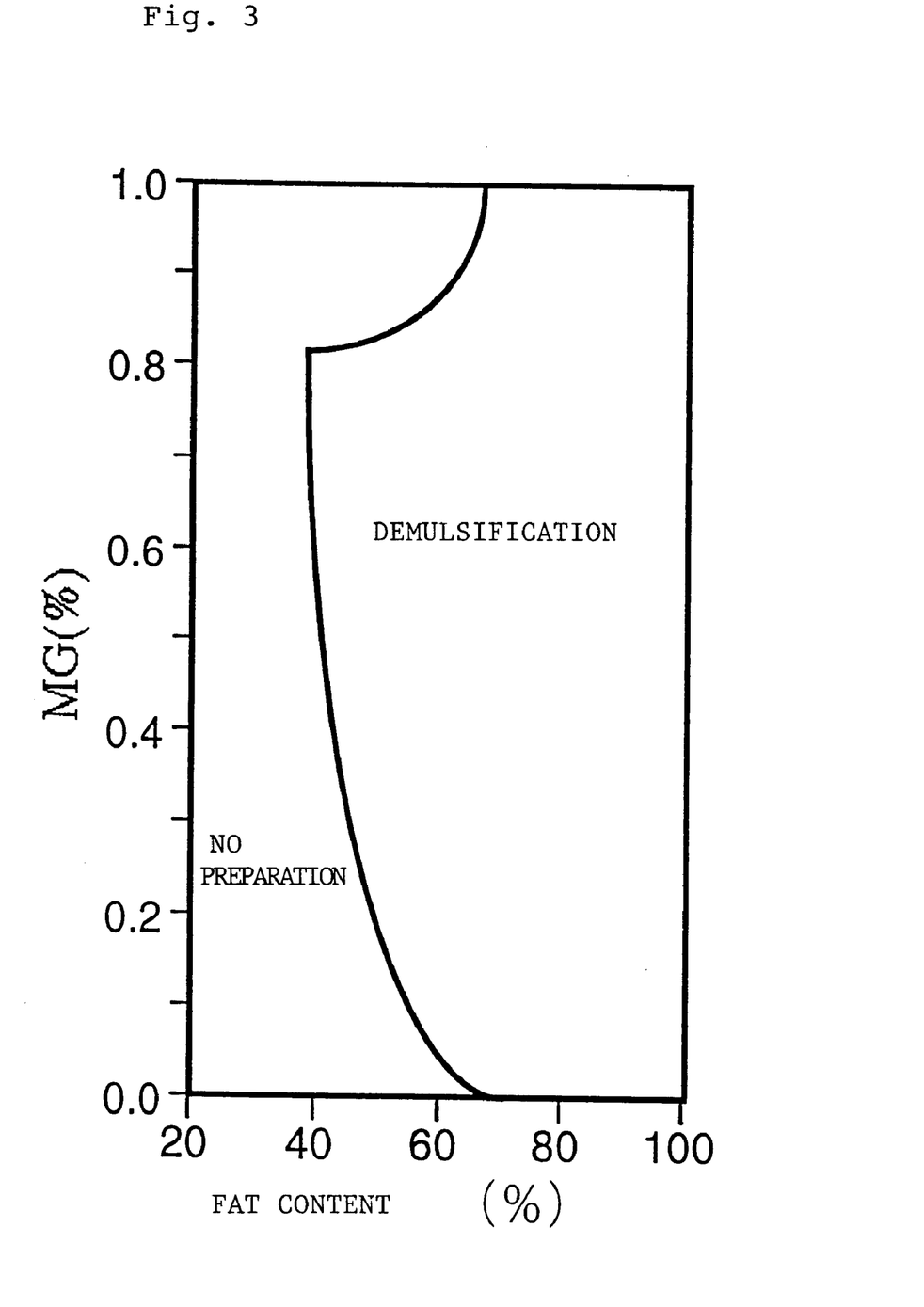
FIG. 3 shows the effects of different amounts of glycerin fatty acid ester and fat contents on preparation and demulsification of a spread.

Firstly, the use of MG alone as the emulsifier was evaluated. As evident on FIG. 3 showing the relationship between MG and fat content regarding whether the production of spread can be carried out or whether demulsification proceeds, the addition of 0.8 wt. % of MG resulted in an electric conductivity increase of the spread having 40 wt. % fat content upto 0.6 mS/cm and the demulsification occurred. However, it is not preferable to add 0.8 wt. % of MG in view of taste. On the other hand, in order to obtain a spread having a fat content of 40 wt. % or less than 40 wt. %, at least 0.8 wt. % of MG has to be added. Therefore, it is not possible to produce a tasty spread of a fat content of 40 wt. % or less by using MG alone.

Figure 4:
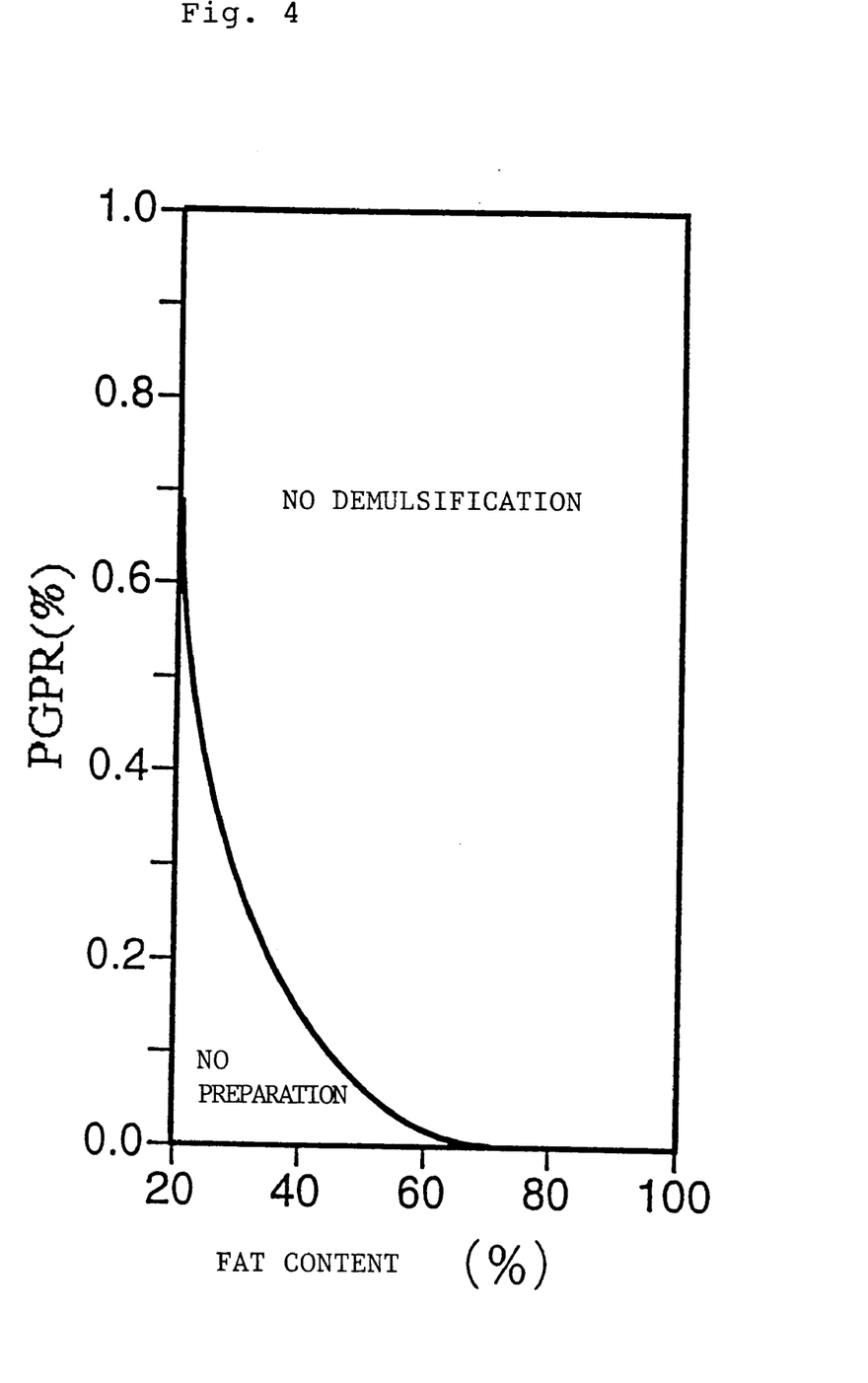
FIG. 4 shows the effects of different amounts of polyglycerol condensed ricinoleic acid ester and fat contents on preparation and demulsification of a spread.

Then, PGPR, the most commonly used for preparation of the low-fat spreads was tested As shown in FIG. 4, in a low-fat spread of 40 wt. % fat content, addition of 0.1 wt. % PGPR made emulsification possible, but the resultant emulsion product had no properties suitable as a spread, because of water separation when the emulsion product was retained at low temperature (5° C.). Demulsification, thus, could not be evaluated. Although a spread was prepared by adding PGPR at 0.2 wt. % or more, no demulsification of the spread thus obtained occurs.

Further investigation was made using the combination of the above two emulsifiers using a spread with 20 wt. % fat content. A low-fat spread was prepared as described in Example 1 and the amounts of PGPR and MG to be added were tested. It was found that the electric conductivity at approximately 36° C. rose to at least 0.1 mS/cm within 300 seconds (FIG. 6) and demulsification occurred by fixing the ratio between PGPR and MG to be added.

Figure 5:
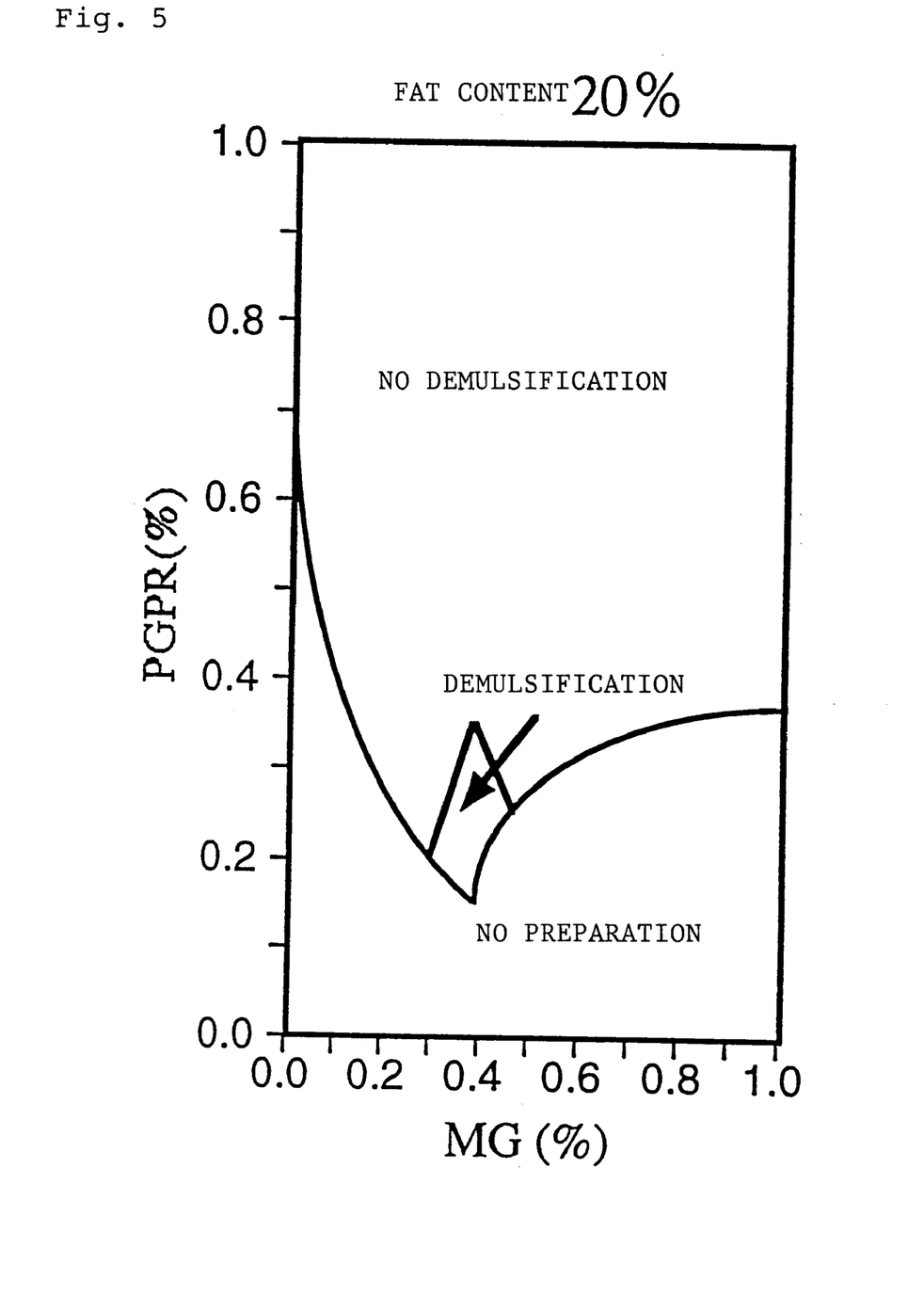
FIG. 5 shows the effects of different amounts of glycerin fatty acid ester and polyglycerol condensed ricinoleic acid ester on preparation and demulsification of a spread having 20 wt. % fat content.

Regarding the range of the amounts of PGPR and MG added, the points at which demulsification occurs, and the points at which the production of spread is no longer possible are shown in FIG. 5. As is clear from FIG. 5, a low-fat spread with 20 wt. % fat content could be demulsified by adding 0.15 to 0.35 wt. % PGPR and 0.3 to 0.5 wt. % MG. Further, as to a low-fat spread of 40 wt. % fat content, it could be demulsified when 0.01 to 0.35 wt. % PGPR and 0.5 to 0.8 wt. % MG were added. Regarding those results, it can be concluded that a low-fat spread of a fat content of 40 wt. % or less than 40 wt. %, which can be swiftly demulsified at the temperature inside the mouth, can be prepared by adding 0.01 to 0.35 wt. % PGPR and 0.3 to 0.8 wt. % MG as emulsifiers.

Figure 7:
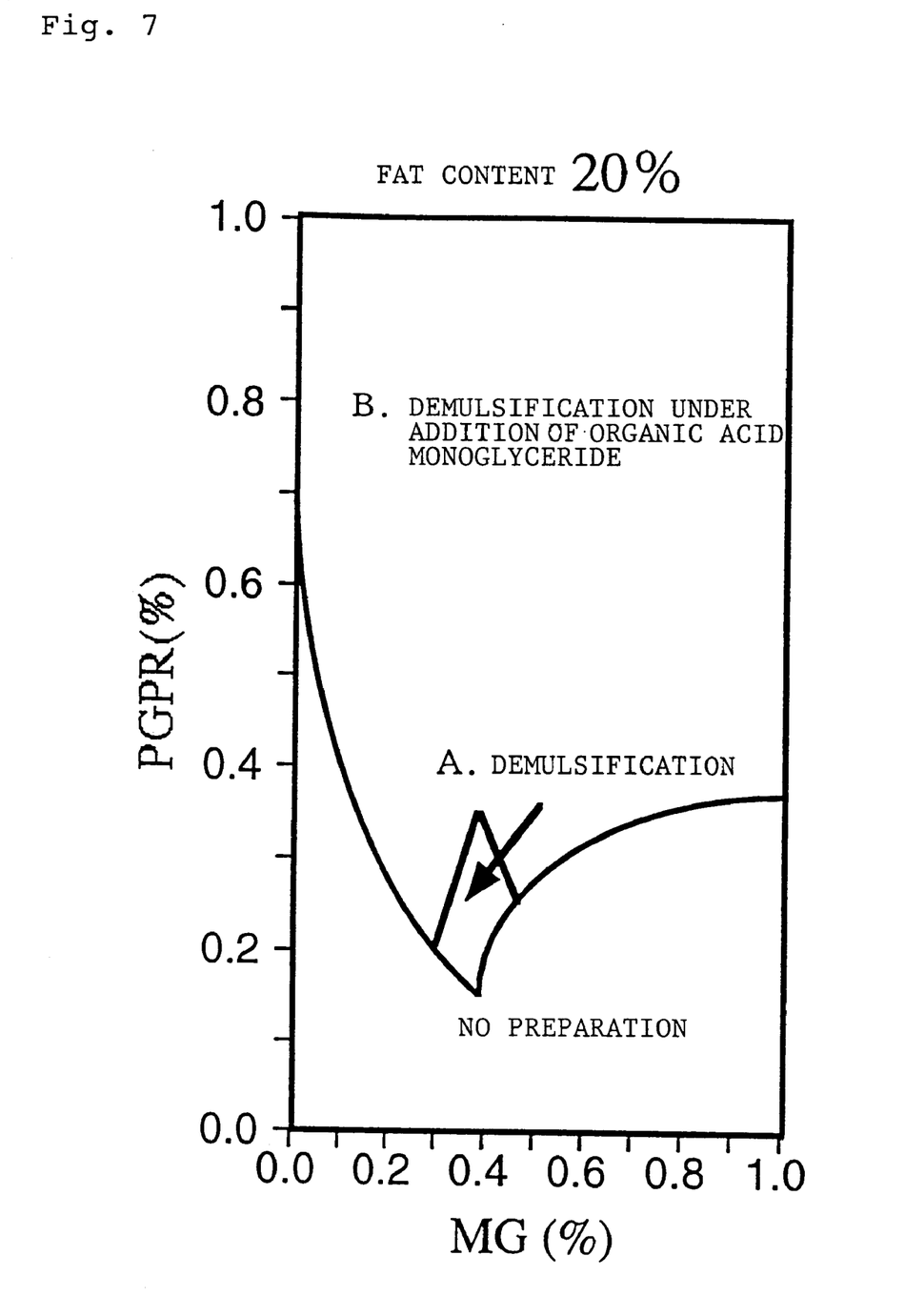
FIG. 7 shows the effect of organic acid monoglyceride on demulsification of a spread having 20 wt. % fat content. Area A indicates the proportion between polyglycerol condensed ricinoleic acid ester and glycerin fatty acid ester, at which demulsification occurs when only those two are used. Area B indicates the proportion of these components which enables to demulsification of the spread by further addition of organic acid monoglyceride.

It is also possible to increase the rising rate of electric conductivity, i.e. to improve demulsification, by adding organic acid monoglyceride in addition to PGPR and MG as emulsifiers. Comparing FIGS. 5 and 7, it is obvious that even at the point, where no demulsification takes place if only PGPR and MG were used (e.g., a point within the area where no demulsification occurred by 0.5 wt. % MG and 0.4 wt. % PGPR as shown in FIG. 5), demulsification occurs, i. e., its demulsification characteristics is improved when organic acid monoglyceride is added.

In case combination of these emulsifiers is used, as the composition of each emulsifier, 0.01 to 1.0 wt. % of PGPR; 0.1 to 1.0 wt. % of MG; and 0.05 to 1.0 wt. % of organic acid monoglyceride may be used.

According to the present invention, PGPRs include any of conventionally used PGPRs in preparation of spreads such as condensed ricinoleic acid hexaglycerin ester.

MGs include any of conventionally used MGs in the preparation of spreads, such as distilled unsaturated monoglyceride.

Organic monoglycerides include citric acid monoglyceride, succinic acid monoglyceride, diacetyl tartaric acid monoglyceride, lactic acid monoglyceride and acetic acid monoglyceride and the like, and at least one of them can be used as needed. Preferred composition is 0.05 to 0.2 wt. % for citric acid monoglyceride, 0.2 to 0.4 wt. % for succinic acid monoglyceride, 0.2 to 0.4 wt. % for diacetyl tartaric acid monoglyceride, 0.3 to 1.0 wt. % for lactic acid monoglyceride, and 0.6 to 0.9 wt. % for acetic acid monoglyceride.

Then, preparation of the low-fat spread according to the present invention is described below. Each process per se for the preparation of the low-fat spread according to the present invention can be carried out according to conventional methods. Firstly, an emulsion can be obtained by emulsifying and dispersing at least 60 wt. % of aqueous phase into oil phase containing 0.01 to 0.35 wt. % of PGPR and 0.3 to 0.8 wt. % of MG. Then, a salt-containing low-fat spread can be obtained by cooling rapidly the resulting emulsion to plasticize it according to conventional method, whereby sterilizing can be carried out if necessary before the cooling.

Alternatively, the emulsion can be prepared by emulsifying and dispersing at least 60 wt. % aqueous phase into oil phase containing 0.01 to 1.0 wt. % of PGPR, 0.1 to 1.0 wt. % of MG and 0.05 to 1.0 wt. % of organic acid monoglyceride. Then, a salt-containing low-fat spread can be obtained by cooling rapidly the resulting emulsion to plasticize it according to conventional method, whereby sterilizing can be carried out if necessary before the cooling.

According to the present invention, oil phases may comprise oils or fats and oily or fatty materials. As the materials, any of them commonly used in the spread making industry can be used. For example, vegetable oils and fats, animal oils and fats, hardened oils thereof, ester exchanged oil, fractionated oil, and milk fats; and any combination of those can be used so long as it is a solid oil which satisfies the product hardness required for the low-fat spread. Composition of oil phase is 40 wt. % or less than 40 wt. % and the lower limit is defined as the lowest content to achieve specifics as the spread, preferably 20 wt. %, for example.

The aqueous phase according to the present invention may comprise water and a water-soluble material(s). As the materials, any one commonly used in the spread making industry can be used. For reasons explained later, particularly water-based materials containing protein, such as raw milk, milk, skimmed milk, reconstituted skimmed milk, are preferable to obtain a better demulsification.

Other water soluble additives, which can be added into aqueous phase, include salt, stabilizers such as gelatin, and flavorings. For salt, sodium chloride is used mainly at 0.8 to 1.5 wt. %, preferably at 1.0 to 1.3 wt. %.

The low-fat spread thus obtained is characterized in having a fat content of 40 wt. % or less than 40 wt. % and an electric conductivity increase of at least 0.1 mS/cm within 300 seconds at approximately 36° C. This electric conductivity an be measured using HORIBA 3582-10D electrodes and HORIBA ES-12 conductivity meter as shown in FIG. 1, where 10 g of the sample was added into 400 g aqueous phase kept at 36° C. approximately equal to the temperature inside the mouth in two beakers connected each other provide with a screen between them to prevent the sample from touching electrodes. Aqueous phase is kept at a constant temperature of 36° C. using a constant temperature chamber (Tokyo Rika Kikai PCC-7000), while stirred the content of the beakers at approximately 120 rpm. The change in electric conductivity was measured by a voltmeter (HP3852A) and expressed in terms of mS/cm. The electric conductivity is measured salt released from the aqueous phase in the spread; therefore aqueous phase should contain salt. In normal spreads, the salt content is about 1 wt. %. According to the present invention an equivalent concentration of salt may be sufficient. Low-fat spread according to the present invention demulsifies at approximately 36° C., and salt contained in aqueous phase is released, resulting in a rise in electric conductivity. Along with demulsification at approximately 36° C., other constituents such as flavoring are released together with salt: an agreeable flavor permeates the mouth.

The low-fat spread according to the present invention is demulsified in the mouth when it is eaten and the preferable flavor is released. In order to produce such low-fat spread, the choice of emulsifiers and its combination and the amount added are important factors. Moreover, the additives to be included in the aqueous phases in the spread can influence on its demulsification. That is, protein-containing materials such as raw milk, milk, skimmed milk, powdered skimmed milk raise electric conductivity within 300 seconds at 36° C. Although it is not exactly understood why protein is effective on the demulsification, an interaction between protein and the emulsifier(s) is considered.

The present invention will be further explained by the following Examples.

EXAMPLE 1

A salt-containing low-fat spread was prepared according to the composition shown in Table 1. Firstly, the emulsifiers were added to the fat and the resultant mixture was stirred while the temperature of the mixture was kept at 60° C., to prepare oil phase. Then, salt and gelatin were added to water, dissolved by mixing, to make a homogeneous aqueous phase. The resultant aqueous phase was poured into the oil phase while stirring to emulsify. The resulting emulsion was sterilized at 80° C. Using a combinator and a botator as rapid cooling/solidifying equipment, the emulsion was cooled to 5° C. and plasticized. Thus obtained spread was designated as Product No. according to the present invention.

TABLE 1

| INGREDIENT | AMOUNT ( WT. %) |
|---|---|
| Soybean oil | 20 |
| PGPR [1] | 0.25 |
| MG [2] | 0.5 |
| Gelatin | 2.0 |
| Salt | 1.3 |
| Water | 75.95 |

[1] PGPR = condensed ricinoleic acid hexaglycerin ester
[2] MG = unsaturated distilled monoglyceride

REFERENCE EXAMPLE 1

A salt-containing low-fat spread was produced according to the composition shown in Table 2. The spread was prepared in the similar way as Example 1 and the resulting spread was designated as Reference Product No. 1.

TABLE 2

| INGREDIENT | AMOUNT ( WT. %) |
|---|---|
| Soybean oil | 20 |
| PGPR [1] | 0.4 |
| MG [2] | 0.5 |
| Gelatin | 2.0 |
| Salt | 1.3 |
| Water | 75.8 |

[1] PGPR = condensed ricinoleic acid hexaglycerin ester
[2] MG = unsaturated distilled monoglyceride Each of the low-fat spreads obtained in Example 1 and Reference Example 1 was kept at 5° C. and then measured for electric conductivity at 36° C.

Electric conductivity was measured by setting two beakers connected each other through a net placed between them in a constant temperature chamber (Tokyo Rika Kikai PCC-7000) so that the electrodes (HORIBA 3582-10D) did not touched them and maintaining the temperature of 400g of de-ionized water solution within the beakers constantly at 36° C. as shown in FIG. 1. A stirrer was placed at the bottom of each beaker. In one beaker, log of sample was placed, and in the other, an electrode was introduced. Water in both beakers was stirred at 120 rpm. The change in electric conductivity was measured using voltmeter (HP3852A), and expressed in terms of mS/cm. Results are presented in FIG. 6.

Figure 6:
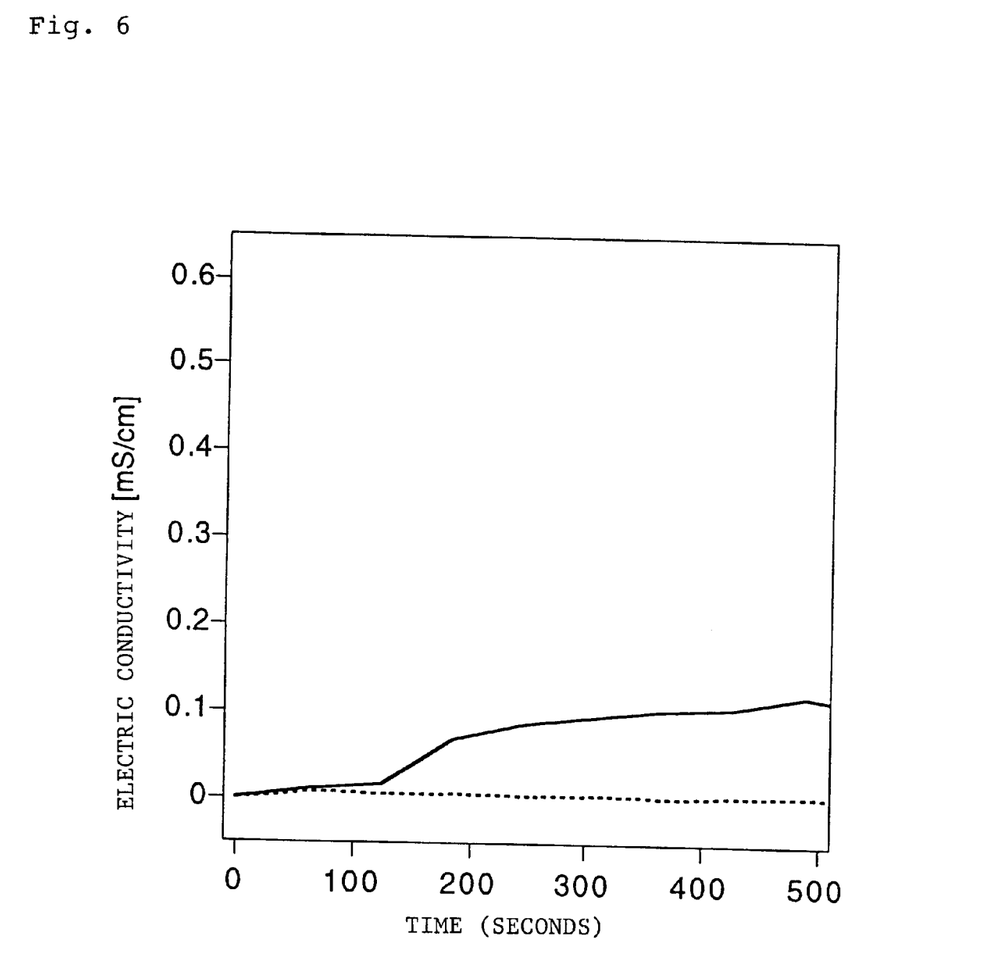
FIG. 6 shows the changes in electric conductivity provided by the spreads obtained in Example 1 and Reference Example 1. The solid line denotes the change for Example 1. The broken line denotes the change for Reference Example 1.

As evident from FIG. 6, electric conductivity of Product No. 1 rose above 0.1 mS/cm within 300 seconds (see the solid line), demonstrating that demulsification at the temperature of the inside of the mouth was good. On the other hand, Reference Product No. 1 (see the dotted line) provided no electric conductivity rise; i.e. no demulsification was occurred at the temperature of the inside of the mouth.

EXAMPLE 2

A salt-containing low-fat spread was prepared according to the composition shown in Table 3. Firstly, the emulsifiers were added to the fat and stirred while being kept at 60° C., to prepare oil phase. Then, salt and gelatin were added to water, dissolved by mixing, to make a homogeneous aqueous phase. The resultant aqueous phase was poured into oil phase while stirring to emulsify. The resulting emulsion was sterilized at 80° C. Using a combinator and a botator as rapid cooling/solidifying equipment, the emulsion was cooled to 5° C. and plasticized. The spread thus obtained was designated as Product No. 2 according to the present invention.

TABLE 3

| INGREDIENT | AMOUNT ( WT. %) |
|---|---|
| Soybean Oil | 20 |
| PGPR [1] | 0.4 |
| MG [2] | 0.5 |
| Succinic acid monoglyceride | 0.35 |
| Gelatin | 2.0 |
| Salt | 1.3 |
| Water | 75.45 |

Figure 8:
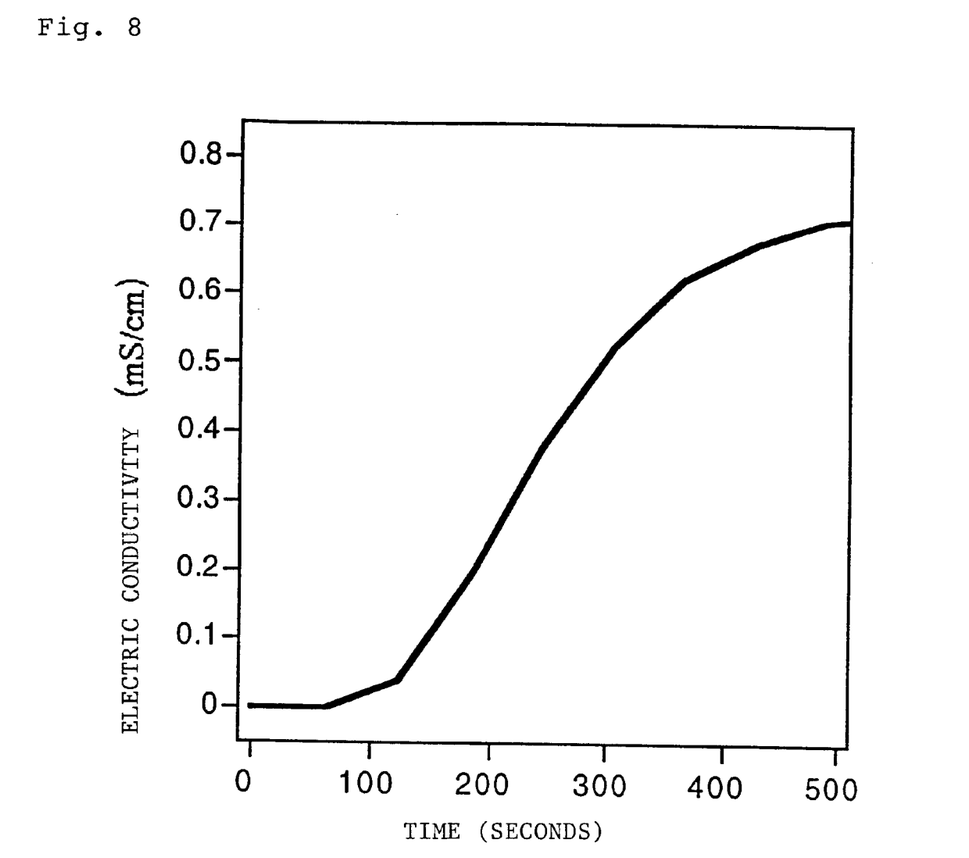
FIG. 8 shows the change in electric conductivity of the spread obtained in Example 2.

[1] PGPR = condensed ricinoleic acid hexaglycerin ester
[2] MG = unsaturated distilled monoglyceride The electric conductivity of Product No. 2 thus obtained according to the present invention was measured by the similar way as Example 1. The result is presented in FIG. 8.

What is claimed is:

1. A salt-containing low-fat spread having a fat content of no more than 40 wt. % and an electric conductivity increase of at least 0.1 mS/cm as measured in deionized water for 300 seconds at approximately 36° C., said spread comprising emulsifier (i) 0.01 to 0.35 weight % of polyglycerol condensed ricinoleic acid ester and 0.3 to 0.8 weight % of glycerin fatty acid ester, or (ii) 0.01 to 1.0 weight % of polyglycerol condensed ricinoleic acid ester, 0.1 to 1.0 weight % glycerin fatty acid ester, and 0.05 to 1.0 weight of organic acid monoglyceride.

2. The salt-containing low-fat spread of claim 1, wherein the fat content ranges from 20 to 40 weight %.

3. The salt-containing low-fat spread according to claim 1, which is obtained by emulsifying at least 60 parts by weight of an aqueous phase and no more than 40 parts by weight of an oil phase by using as an emulsifier a polyglycerol-condensed ricinoleic acid ester in an amount of 0.01–0.35% by weight and a glycerin fatty acid ester in an amount of 0.3–0.8% by weight.

4. The salt-containing low-fat spread according to claim 1, which is obtained by emulsifying at least 60 parts by weight of an aqueous phase and no more than 40 parts by weight of an oil phase by using as an emulsifier a polyglycerol-condensed ricinoleic acid ester in an amount of 0.01–1.0% by weight, a glycerin fatty acid ester in an amount of 0.1–1.0% by weight, and an organic acid monoglyceride in an amount of 0.05–1.0% by weight.

5. The salt-containing low-fat spread according to claim 1, wherein a salt is contained in an amount of 0.8–1.5% by weight.

6. A method of producing a salt-containing low-fat spread, comprising emulsifying and dispersing at least 60 weight % aqueous phase into 40 weight % or less than 40 weight % oil phase containing 0.01 to 0.35 weight % of polyglycerol condensed ricinoleic acid ester and 0.3 to 0.8 weight % of glycerin fatty acid ester.

7. The method according to claim 6, wherein said salt-containing low-fat spread has a fat content of no more than 40 wt. % and an electric conductivity increase of at least 0.1 mS/cm as measured in deionized water for 300 seconds at approximately 36° C.

8. A method of producing a salt-containing low-fat spread, comprising emulsifying and dispersing at least 60 weight % aqueous phase into 40 weight % or less than 40 weight % oil phase containing 0.01 to 1.0 weight % of polyglycerol condensed ricinoleic acid ester, 0.1 to 1.0 weight % glycerin fatty acid ester, and 0.05 to 1.0 weight % of organic acid monoglyceride.

9. The method according to claim 8, wherein said salt-containing low-fat spread has a fat content of no more than 40 wt. % and an electric conductivity increase of at least 0.1 mS/cm as measured in deionized water for 300 seconds at approximately 36° C.

10. A method of producing a salt-containing low-fat spread, comprising the steps of:

selecting an emulsifier and its amount to be included in a salt-containing low-fat spread (i) in an amount of 0.01 to 0.35 weight % of polyglycerol condensed ricinoleic acid ester and 0.3 to 0.8 weight % of glycerin fatty acid ester, or (ii) in an amount of 0.01 to 1.0 weight % of polyglycerol condensed ricinoleic acid ester, 0.1 to 1.0 weight % glycerin fatty acid ester, and 0.05 to 1.0 weight % of organic acid monoglyceride, which emulsifier and its amount impart to a salt-containing low-fat spread an electric conductivity increase, which is measurable in deionized water at approximately 36° C.; and emulsifying an aqueous phase and an oil phase by using the selected emulsifier in the selected amount to produce a salt-containing low-fat spread.

11. The method according to claim 10, wherein the electric conductivity increase is at least 0.1 mS/cm as measured in deionized water for 300 seconds at approximately 36° C.

12. The method according to claim 10, wherein said salt-containing low-fat spread has a fat content of no more than 40 wt. % and a salt content of 0.814 1.5 wt. %.

* * * * *

UNITED STATES PATENT AND TRADEMARK OFFICE
CERTIFICATE OF CORRECTION

PATENT NO. : 6,153,248
DATED : November 28, 2000
INVENTOR(S) : Asuka Tajiri, Osamu Kimura and Yasuhiko Shiinoki It is certified that error appears in the above-identified patent and that said Letters Patent is hereby corrected as shown below:

Title page,
Item [73] Assignee, please correct "Snow Brank Milk Products Co., Ltd." to -- Snow Brand Milk Products Co., Ltd. --.

Signed and Sealed this

Sixth Day of November, 2001

Attest:

NICHOLAS P. GODICI
Attesting Officer   Acting Director of the United States Patent and Trademark Office

UNITED STATES PATENT AND TRADEMARK OFFICE
CERTIFICATE OF CORRECTION

PATENT NO.      : 6,153,248
DATED           : November 28, 2000
INVENTOR(S)     : Asuka Tajiri et al.

It is certified that error appears in the above-identified patent and that said Letters Patent is hereby corrected as shown below:

Column 8,
Line 62, delete "0.814 1.5" and insert -- 0.8-1.5 --.

Signed and Sealed this

Twenty-first Day of October, 2003

JAMES E. ROGAN
*Director of the United States Patent and Trademark Office*